Aug. 31, 1926.
H. E. SMITH
1,598,455
SIGNAL FOR TIRE INFLATERS
Filed Nov. 27, 1925
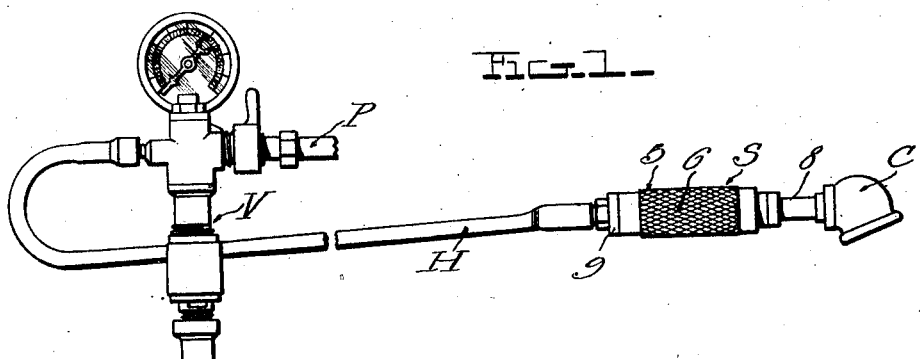
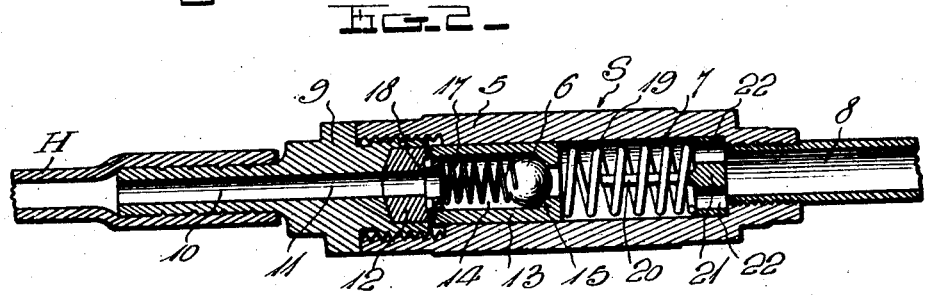
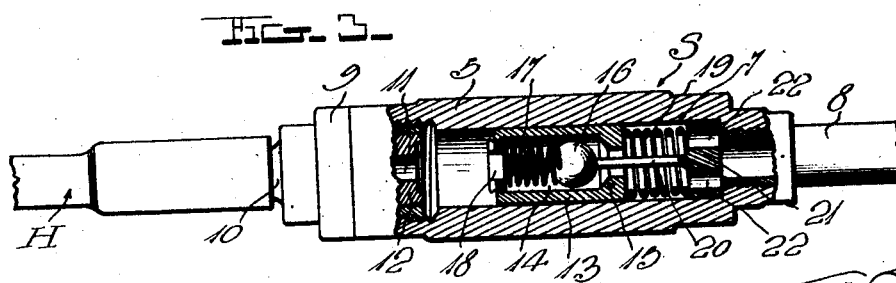
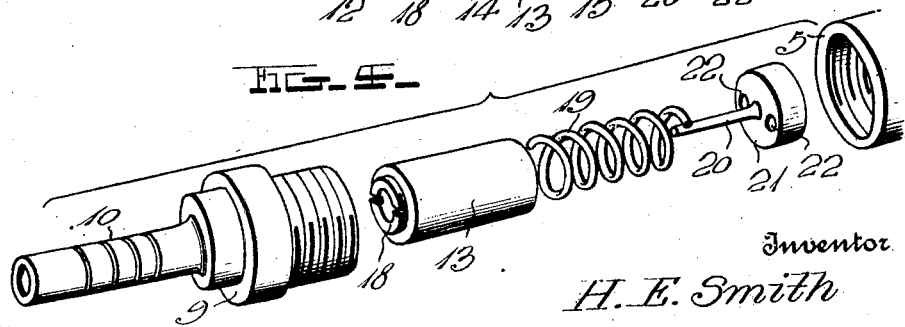
Witness
H. Woodard
Inventor
H. E. Smith
By H. R. Wilson & Co.
Attorneys Patented Aug. 31, 1926.

1,598,455

UNITED STATES PATENT OFFICE.

HARVEY E. SMITH, OF TACOMA, WASHINGTON, ASSIGNOR OF ONE-HALF TO WALTER E. RICHTER, OF TACOMA, WASHINGTON.

SIGNAL FOR TIRE INFLATERS.

Application filed November 27, 1925. Serial No. 71,814.

This application is a continuation in part of certain subject matter previously claimed in my U. S. patent application Serial No. 21434, filed April 7, 1925, which subject matter was canceled from that application due to a requirement for division, and in addition to including continuing subject matter, the present application relates also to features not disclosed in the prior application.

The invention has reference to tire inflation and its primary use is in conjunction with an inflation hose provided with the ordinary tire valve engaging chuck and leading from an automatic pressure-regulating valve, the latter functioning to automatically cut off the passage of air to the tire as soon as such tire has been inflated to a predetermined pressure. Inflation systems of this character are known, but it is the primary object of my invention to provide a unique signal which is operated by flow of air to the tire, but automatically ceases to function when such flow of air is arrested, upon complete inflation of the tire, thereby indicating to the user that the inflation operation is completed.

A still further aim is to provide signaling means which will vibrate a hand-held portion of the air conduit until final inflation of the tire has been accomplished, whereby cessation of the vibrations will give notice to the user that the tire inflating operation is completed. The user thus relies on his sense of touch rather than sight or hearing and hence the device is well adapted for use where thorough lighting cannot always be obtained and in surroundings where machine repairing or other causes, necessitate a great deal of noise. The form of the device herein disclosed, does produce sound when operating, and such sound of course ceases when the passage of air to the conduit is stopped, so that the sound may be utilized as a signal if conditions are such that it can be readily heard.

Another aim of the invention is to provide a signal which is independent of the pressure-regulating valve and is located at the delivery end of the air hose, so that its operation is readily detected when holding the chuck on a tire valve.

Yet another object is to embody the signal in a hollow handle which is rigidly attached to the tire valve-engaging chuck and establishes communication between said chuck and the air hose, the handle being used to hold the chuck upon the tire valve.

With the foregoing and such objects as may hereinafter become apparent, in view, the invention resides in the novel subject matter hereinafter described and claimed, the description being supplemented by the accompanying drawing.

Figure 1 is an elevation of a tire inflating means embodying my invention.

Figure 2 is a longitudinal sectional view through the indicator or signal.

Figure 3 is a view similar to Fig. 2, partly in elevation, showing a different relation of parts.

Figure 4 is a perspective view of a number of parts of the signal, in disassembled relation.

In the drawing above briefly described, tire inflating means has been shown comprising briefly, an air pressure supply pipe P, an adjustable pressure regulating valve V connected with said pipe, an inflation hose H leading from the valve V, a signal S connected with the free end of the hose H, and a conventional form of tire valve-engaging chuck C rigidly attached to the signal S. The valve V may be of the type disclosed in my prior application, above referred to, or of any other desired construction, and it functions to automatically cut off the passage of air through the hose H and connected parts, into a tire, when the latter has been inflated to a predetermined extent. During the inflation of the tire, the flow of air to the tire, continuously operates the signal S, but as soon as such flow of air is cut off by the valve V, the signal automatically ceases to function, so that the user immediately knows that the inflation operation has been completed.

The signal S is preferably of the construction herein disclosed. The numeral 5 on the drawing designates a horizontally elongated tubular body preferably serrated as at 6 so that it may be anti-slippingly held. This body is formed with a longitudinal bore 7 and its front end may be connected with the chuck C by a short pipe section 8. The rear end of the body 5 is closed by a plug 9 having a nipple 10 to which is connected the hose H, said plug and nipple having a passage 11 leading to the bore 7. Inset in the inner end of this plug 9, I have shown a cushion 12 of leather or other desired material, for a purpose to appear.

Slidingly mounted in the bore 7, is a plunger 13 having a longitudinal passage 14 therethrough, said passage having both of its ends open. The end of the passage 14 disposed toward the pressure outlet 8, is formed with an internal valve seat 15 against which a ball valve 16 is normally held by a comparatively weak spring 17, said valve and spring being located in said passage 14. The spring 17 may well react against an annular plug 18 threaded into one end of the plunger 13.

Interposed between the delivery end of the bore 7, that is the end which delivers pressure into the pipe 8, and the plunger 13, is a comparatively stiff coil spring 19 which tends to force the plunger toward the cushion 12. Located in the aforementioned delivery end of the bore 7, is an inwardly projecting longitudinal pin 20 which may well be carried by a disk 21 snugly seated in the bore, said disk having air passages 22. This pin is adapted to open the valve 16 whenever the plunger 13 moves sufficiently toward said pin, as will be fully described hereinafter.

As soon as the chuck C is applied to a tire valve and the valve of said chuck is thus opened in the usual way, passage of air through the signal will force the plunger 13 to the right in the drawing, until the pin 20 opens the valve 16, whereupon the pressure which has previously been behind the plunger, escapes and travels on to the tire. When this escape of pressure takes place, there is nothing to hold the plunger 13 in the position to which it has been projected, against the action of the spring 19. The result is, that this spring immediately returns the plunger toward the pad 12, and during this return movement, the valve 16 again closes. The pressure then again forces the plunger 13 toward the right, the valve 16 is again opened by the pin 20, etc. It will thus be seen that the plunger 13 and the valve 16 are rapidly reciprocated by the flow of pressure to the tire, and this reciprocation vibrates the body 5 which is being held in one of the user's hands. This vibration continues as long as air is passing to the tire, but ceases as soon as the tire is fully inflated and the passage of air thereto is automatically cut off by the valve V. This cessation of vibration and the discontinuance of the noise caused by operation of the plunger and valve, give notice to the user that flow of air through the device has stopped, thus indicating to him that the tire is fully inflated. He is thus relieved of the necessity of holding the chuck upon the tire valve longer than is necessary and he need have no anxiety as to whether air is entering the tire when the chuck is applied.

It will be seen from the foregoing that while the invention is simple and inexpensive, it will be efficient and very desirable, and as excellent results have been obtained from the details disclosed, such details are by preference followed. However, within the scope of the invention as claimed, numerous variations may be made.

I claim:

1. In a tire inflating means having a conduit through which air under pressure may be passed; an audible signal in communication with said conduit and continuously operated by flow of air therethrough into the tire, whereby complete inflation of the tire is indicated to the operator by the automatic stilling of the signal.

2. In a tire inflating device, a tire valve engaging chuck, an air conduit leading to said chuck and having a portion to be held in the user's hand, and means operated by flow of air through the conduit for vibrating said hand-held portion as long as air is passing to the tire, whereby cessation of the air flow upon complete inflation of the tire is indicated to the user by automatic cessation of the vibrations of said hand-held portion.

3. An elongated tubular casing provided at one end with means for coupling it to a tire inflating hose, and provided at its other end with means for connecting it to a tire valve engaging chuck to form a handle for holding the latter against a tire valve, and a signal in said casing adapted for continuous operation by passage of air therethrough.

4. An elongated tubular casing provided at one end with means for coupling it to a tire inflating hose, and provided at its other end with means for connecting it to a tire valve engaging chuck to form a handle for holding the latter against a tire valve, and a vibratory signal in said casing adapted for continuous operation by passage of air therethrough.

5. A flow indicator comprising a body having a bore, a pressure inlet into one end of said bore and a pressure outlet at the other end of said bore, a plunger slidably received in said bore and having a passage extending longitudinally thereof, said passage opening at both ends into the bore, a valve for said passage, a relatively weak spring tending to seat said valve, a comparatively strong spring acting against the plunger to move said plunger and its valve toward the inlet end of the bore, and means for automatically opening said valve each time the plunger and valve are forced toward the delivery end of the bore by flow of pressure through said bore.

6. A flow indicator comprising a body having a bore, a pressure inlet into one end of said bore and a pressure outlet at the other end of said bore, a plunger slidably received in said bore and having a passage extending longitudinally thereof, said passage opening at both ends into the bore, a check valve for and within said passage closable toward the delivery end of the bore, a relatively weak spring tending to seat said valve, a comparatively strong spring acting against the plunger to move said plunger and its valve toward the inlet end of the bore, and an inwardly projecting pin at the delivery end of said bore for automatically opening said valve each time the plunger and valve are forced toward the delivery end of the bore by flow of pressure through said bore.

In testimony whereof I have hereunto affixed my signature.

HARVEY E. SMITH.